United States Patent
Diab et al.

(10) Patent No.: US 8,619,604 B2
(45) Date of Patent: Dec. 31, 2013

(54) SYSTEM AND METHOD FOR AUTO 10BASE-T/10BASE-TE SELECTION BASED ON CABLE CHARACTERISTICS

(75) Inventors: Wael William Diab, San Francisco, CA (US); Minshine Shih, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 414 days.

(21) Appl. No.: 12/578,612

(22) Filed: Oct. 14, 2009

(65) Prior Publication Data

US 2011/0085454 A1   Apr. 14, 2011

(51) Int. Cl.
- *H04L 12/26* (2006.01)
- *G06F 1/32* (2006.01)
- *G06F 1/00* (2006.01)

(52) U.S. Cl.
USPC ........... 370/252; 370/231; 370/235; 713/320; 713/322

(58) Field of Classification Search
USPC ......... 370/252, 352, 401, 445, 230, 231, 235, 370/236, 395.5, 465; 713/310, 320, 322, 713/226; 709/226
See application file for complete search history.

(56) References Cited

U.S. PATENT DOCUMENTS

| | | | |
|---|---|---|---|
| 2007/0192505 A1* | 8/2007 | Dalmia | 709/233 |
| 2007/0237163 A1* | 10/2007 | Kadambi et al. | 370/401 |
| 2008/0170509 A1* | 7/2008 | Diab et al. | 370/252 |
| 2008/0225894 A1* | 9/2008 | Powell | 370/477 |
| 2008/0232397 A1* | 9/2008 | Muth | 370/465 |
| 2009/0119524 A1* | 5/2009 | Hays | 713/322 |
| 2010/0262848 A1* | 10/2010 | Bobrek et al. | 713/320 |
| 2010/0293441 A1* | 11/2010 | Booth | 714/776 |
| 2010/0325463 A1* | 12/2010 | Lindsay | 713/330 |
| 2011/0035498 A1* | 2/2011 | Shah et al. | 709/226 |

OTHER PUBLICATIONS

Dan Stiurca "Re-optimization of Cat5 Twisted Pair Model for 10BASE-Te" IEEE802.3 Sep. 2008 interim Meeting.*

* cited by examiner

*Primary Examiner* — Awet Haile
(74) *Attorney, Agent, or Firm* — Duane S. Kobayashi (57) ABSTRACT

A system and method for auto 10BASE-T/10BASE-Te selection based on cable characteristics. IEEE 802.3az defines a new 10BASE-Te PHY type for energy efficiency that runs on Category 5 or better cabling. Configuration of a PHY that supports both 10BASE-T and 10BASE-Te operating modes is based on measurements that provide an indication of channel characteristics.

15 Claims, 5 Drawing Sheets

SYSTEM AND METHOD FOR AUTO 10BASE-T/10BASE-TE SELECTION BASED ON CABLE CHARACTERISTICS

BACKGROUND

1. Field of the Invention

The present invention relates generally to Ethernet systems and methods and, more particularly, to a system and method for auto 10BASE-T/10BASE-Te selection based on cable characteristics.

2. Introduction

The 10BASE-T standard defines transmission at 10 Mbit/s over twisted pair cabling. 10BASE-T transmission requires only two wire pairs to operate. While further IEEE standards have been defined for higher transmission speeds (e.g., 100 Mbit/s 1 Gbit/s, 10 Gbit/s, etc.), physical layer devices (PHYs) that support 10BASE-T transmission remain prevalent in the field. This is due at least in part to the rapid rate of increase in transmission speeds relative to the slower rate of increase in needed application bandwidth. The resulting disparity between bandwidth supply and bandwidth need dictates that 10BASE-T usage will continue far into the future.

A recent emphasis in Ethernet transmission system development is energy efficiency. This emphasis is in response to the continuing escalation of energy costs associated with Ethernet transmission systems. The increase in transmission rates has resulted in a corresponding increase in energy costs. Such being the case, various industries have become increasingly sensitive to the impact of those rising energy costs. Many companies are now looking at their IT systems' power usage to determine whether the energy costs can be reduced.

IEEE 802.3az is the result of such an industry focus and seeks to address the rising costs of IT equipment usage (e.g., PCs, displays, printers, servers, network equipment, etc.) through the usage of Energy Efficient Ethernet (EEE) networks. Included within such an effort is a mechanism to reduce the power consumed by a PHY during 10BASE-T transmission. This lower-power version of 10BASE-T transmission, which is referred to as 10BASE-Te, serves to reduce the voltage levels of the PHY. More specifically, a PHY operating in a 10BASE-T operating mode is designed to have a peak differential voltage on the transmitter circuit when terminated with a 100Ω resistive load of between 2.2V and 2.8V. In contrast, a PHY operating in a 10BASE-Te operating mode is designed to have a peak differential voltage on the transmitter circuit when terminated with a 100Ω resistive load of between 1.54V and 1.96V. This reduced peak differential voltage on the transmitter circuit represents a reduced voltage envelope, which leads to a corresponding reduction in the power envelope. The lower voltage also eliminates the need for higher voltage rails in the system or on the chip. These higher voltage rails would require costly voltage converters, which can also have associated energy inefficiencies. These inefficiencies are multiplied in multi-port systems.

The reduction in voltage serves to reduce the power consumed by the PHY when operating in the 10BASE-Te operating mode as compared to the 10BASE-T operating mode. As noted above, 10BASE-T/10BASE-Te usage is expected to continue far into the future even though the 10 Mbit/s transmission speed can be considered obsolete. PHYs that incorporate both 10BASE-T and 10BASE-Te operating modes will therefore be deployed in networks comprised of existing cabling infrastructure. What is needed therefore is a mechanism that enables auto configuration of PHYs that incorporate both 10BASE-T and 10BASE-Te operating modes during installation.

SUMMARY

A system and/or method for auto 10BASE-T/10BASE-Te selection based on cable characteristics, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
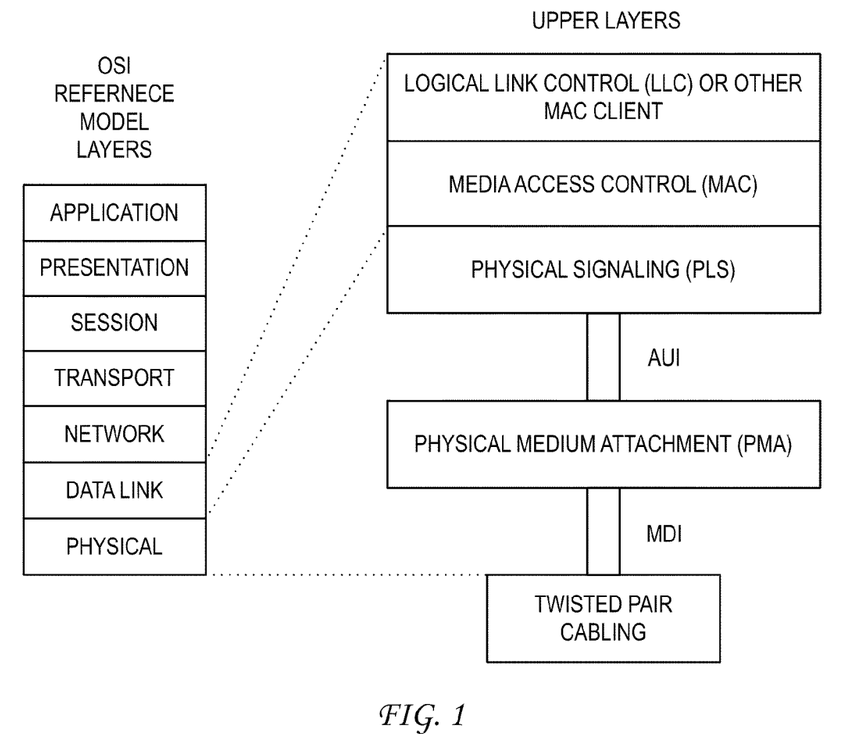
FIG. 1 illustrates an OSI layering diagram.

To illustrate the features of the present invention, reference is first made to FIG. 1, which illustrates the ISO Open System Interconnection (OSI) reference model and its mapping to the IEEE 802.3 architectural layers of the 10BASE-T operational model. As illustrated, a Medium Attachment Unit (MAU), which comprises Physical Medium Attachment (PMA) and Medium Dependent Interface (MDI), is coupled to twisted pair cabling. This twisted pair cabling can be embodied, for example, as 0.5 mm telephone twisted pair (Category 3) cabling to provide data transmission for link distances up to 100 m without the use of a repeater. The MAU couples the twisted pair cabling to the Physical Signaling (PLS) sublayer by way of the Attachment Unit Interface (AUI). As further illustrated, the Media Access Control (MAC) and higher layers reside on top of the PLS sublayer.

In specifying 10BASE-Te PHY operation, IEEE 802.3az does not specify the exact type of cabling to be used. Instead, IEEE 802.3az specifies certain channel characteristics that a cable must meet. Examples of such specified characteristics can include attenuation, characteristic impedance, timing jitter, propagation delay, and several types of noise. In the case of 10BASE-Te, the specified characteristics can be met by Category 5 or better cabling and components. Category 3 cabling can be used to support conventional 10BASE-T operation, but cannot accommodate the reduced voltage envelope used by the newer 10BASE-Te PHYs.

As noted, while the pace of technology has greatly expanded the transmission bandwidth of Ethernet systems, the increased bandwidth has far exceed the bandwidth needs of many applications. Due at least in part to this reason, the installed base of 10BASE-T PHYs in the field will continue unaffected in substantial quantity into the future. In accommodating the substantial existing installed base of legacy 10BASE-T PHY devices, newer devices such as triple-speed 10/100/1000 PHYs can be designed to support both 10BASE-T and 10BASE-Te operating modes. The support of both 10BASE-T and 10BASE-Te operating modes would enable current-generation PHYs to operate with both legacy 10BASE-T devices as well as EEE-focused 10BASE-Te PHYs. In meeting the current interoperability needs, current devices are desired to be configurable to match the operating mode of the peer device.

Owing also to the substantial amount of existing Category 3 twisted pair cabling in the network infrastructure, current devices are desired to be sensitive to the channel characteristics of the twisted pair cabling the connects the two PHYs. If newer Category 5 twisted pair cabling is used in the link, then 10BASE-Te PHY operating modes can be used by both PHYs on the ends of the link. If older Category 3 twisted pair cabling is used in the link, on the other hand, then the 10BASE-T PHY operating mode would be used by both PHYs notwithstanding the capability by both PHYs of supporting the newer 10BASE-Te PHY operating mode.

Conventionally, user input is required to select which PHY operating mode should be activated on a link. Typically, this user input would be based on the type of cabling used (i.e., Category 3 or 5 cabling). This knowledge of the type of cabling would represent a proxy for the knowledge of the channel characteristics, rather than actual knowledge of the channel characteristics. This limited knowledge is imperfect and would yield sub-optimal results.

For example, even assuming that the user could accurately identify a type of cabling through visual inspection, the user can provide erroneous input in the configuration process if the user was visually inspecting the wrong cable. More importantly, however, the identification for the type of cabling does not represent actual knowledge of the channel characteristics. This is significant in that the channel characteristics are based not only on the type of cabling, but also on the length of the cable, temperature of the cable, etc. In determining whether a given port installation can meet the 10BASE-Te specifications of channel characteristics, a failure to consider these other factors could result in a configuration process that is based on a worst-case assumption of the cabling. Here, it should be noted that under the correct circumstances such as a shorter cable, a 10BASE-Te PHY can interoperate with a 10BASE-T PHY. Also, under the correct circumstances such as shorter Category 3 cables, a 10BASE-Te PHY can interoperate with a 10BASE-Te PHY. On longer Category 3 cables, a 10BASE-Te PHY can interoperate with a 10BASE-T PHY or 10BASE-Te PHY, albeit with a higher BER or packet errors. In these various example scenarios, the visual inspection of the cable would not be sufficient to determine the proper operating mode to be used by the PHYs in producing an acceptable 10 Mbit/s link.

It is therefore a feature of the present invention that the measurement of one or more characteristics of the Ethernet cable can be used in the configuration process in selecting between 10BASE-T and 10BASE-Te operating modes. In one embodiment, the measured characteristics are used to identify a type and/or length of Ethernet cable. The identified type of Ethernet cable can be used, for example, in quickly determining whether the 10BASE-Te operating mode can be used. If Category 3 cabling is present, then a decision can be made that 10BASE-Te operating mode cannot be used on the link. If Category 5 or higher cabling is present, then a decision can be made that 10BASE-Te operating mode can be used on the link. As would be appreciated, this simple example uses the type of cabling as a proxy for the channel characteristics. In other examples, the measured characteristics are used more directly in determining whether the 10BASE-Te operating mode can be used.

In one embodiment, the measurement of one or more characteristics is implemented as part of the PHY's analysis of the electrical characteristics of the Ethernet cable. For example, the measurement of the one or more characteristics can be implemented as part of an echo cancellation convergence process implemented by an echo cancellation module in the PHY (See FIG. 2).

Figure 2:
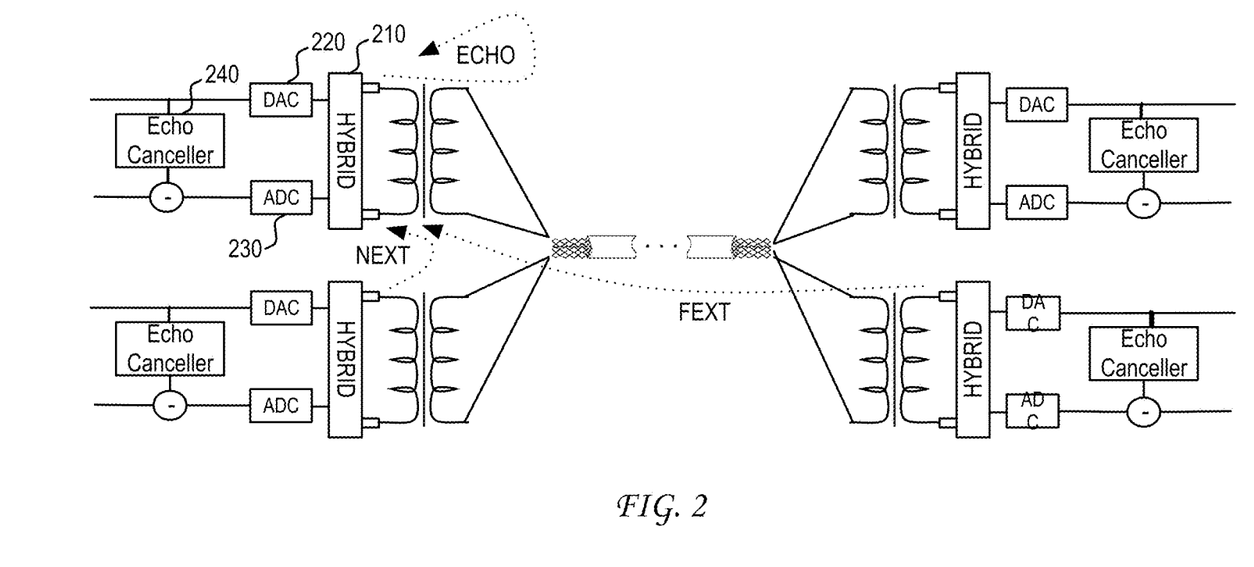
FIG. 2 illustrates an embodiment of a module that measures electrical characteristics of twisted pair cabling.

As illustrated in FIG. 2, two wire pairs are used to facilitate 10 Mbit/s data transmission under either a 10BASE-T or a 10BASE-Te operating mode. Each wire pair is coupled to a hybrid, which is coupled to a PHY using a digital-to-analog converter (DAC) and a analog-to-digital converter (ADC). For example, the PHY that includes echo canceller 240, is coupled to hybrid 210 using DAC 220 and ADC 230.

Echo canceller 240 can be designed to take various measurements that enable a determination of the channel characteristics. For example, echo canceller module 240 can take measurements during an echo canceller convergence process, wherein such measurements enable a determination of cable characteristics such as insertion loss, cross talk, cable length, or the like.

Figure 3:
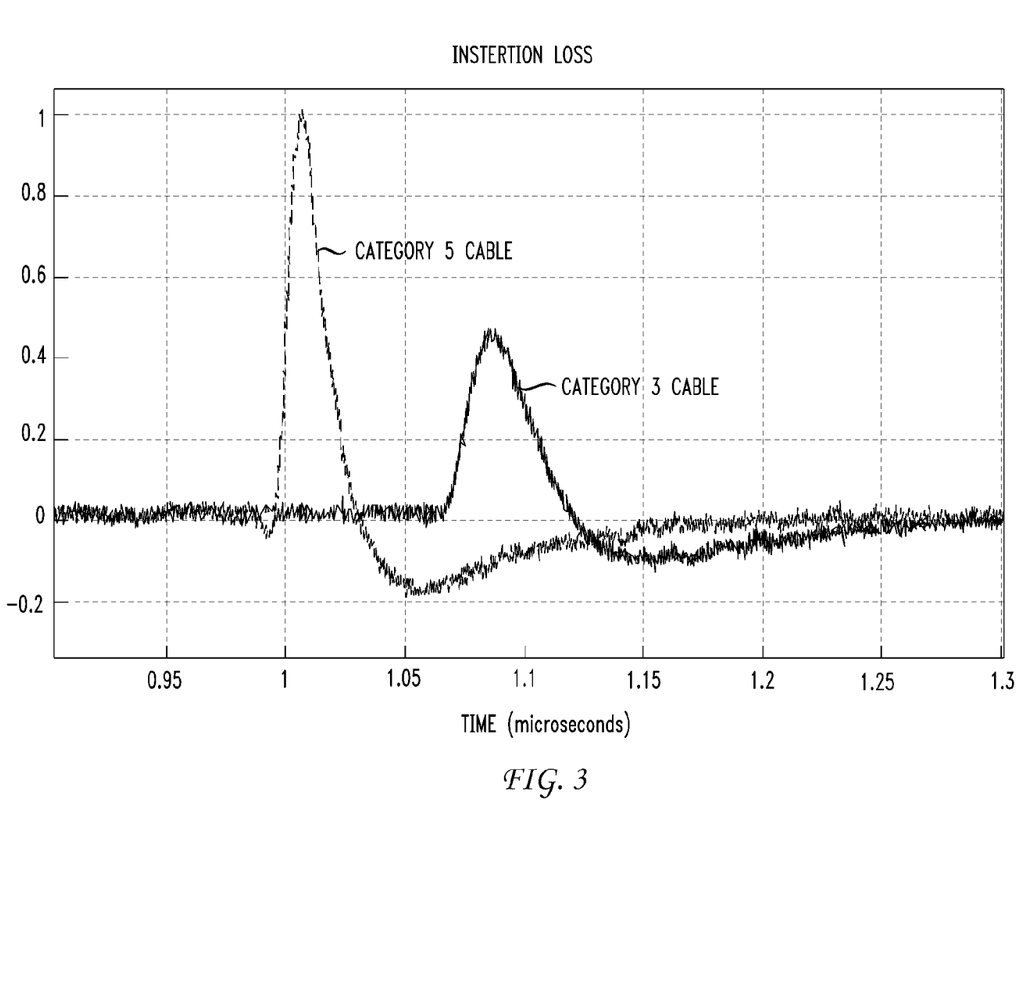
FIG. 3 illustrates an example of insertion loss measurements for Category 3 and Category 5 cable.

In general, different cable types conform to their own standards defining insertion loss over a range of frequencies. Electrical signals traveling down the cable attenuates differently with respect to the cable type. The insertion loss is a function of both frequency and cable length and is well defined for each cable type. To determine the cable type, the PHY can transmit one, multiple or continuous pulses with pre-determined frequency components into the cable. At the receiving end, the PHY can measure the magnitude attenuation and phase distortion, then combine this information with cable length to determine the cable type. FIG. 3 illustrates an example of insertion loss that can be measured for 100 m of Category 3 and Category 5 cable.

In one embodiment, the link partner can be powered off and the cable pair can be disconnected either on the line side of the transformer or on the opposite (transceiver) side of the transformer. In this case, almost all of the incidental pulse(s) are reflected back to the transmitting end with the same polarity, and the pulse(s) undergoes insertion loss corresponding to twice the cable length. In another embodiment, the link partner can be powered off and the cable pair is shorted either on the line side of the transformer or on the opposite (transceiver) side of the transformer. In this case, almost all of the incidental pulse(s) are reflected back to the transmitting end with the opposite polarity, and the pulse(s) undergoes insertion loss corresponding to twice the cable length. In another embodiment, the link partner can be powered off and two cable pairs are disconnected and shorted to the other pair to form a loop (e.g., A+ shorted to B+ and A− shorted to B−). This can happen on either the line side of the transformer or on the opposite (transceiver) side of the transformer. In this case, almost all of the incidental pulse(s) are routed back to the transmitting end in a different pair, and the pulse(s) undergoes insertion loss corresponding to twice the cable length. In another embodiment, the link partner can be temporarily powered on to transmit pre-determined pulse(s). In this case, the pulse(s) undergoes insertion loss corresponding to the cable length.

During transmission, several conditions can occur in each of the twisted wire pairs. For example, inter-symbol interference (ISI) may occur as a result of frequency dependent wire attenuation. As illustrated in FIG. 2, an ECHO component may be received in a twisted wire pair wire from an echo that results from transmission in the upstream direction on the same twisted-pair wire. A near-end crosstalk (NEXT) component may also be received in a twisted-pair wire from the local transmitter corresponding to the adjacent twisted wire pair. Moreover, a far-end crosstalk (FEXT) component may also be received in a twisted wire pair from the transmitter at the other end of the link.

Figure 4:
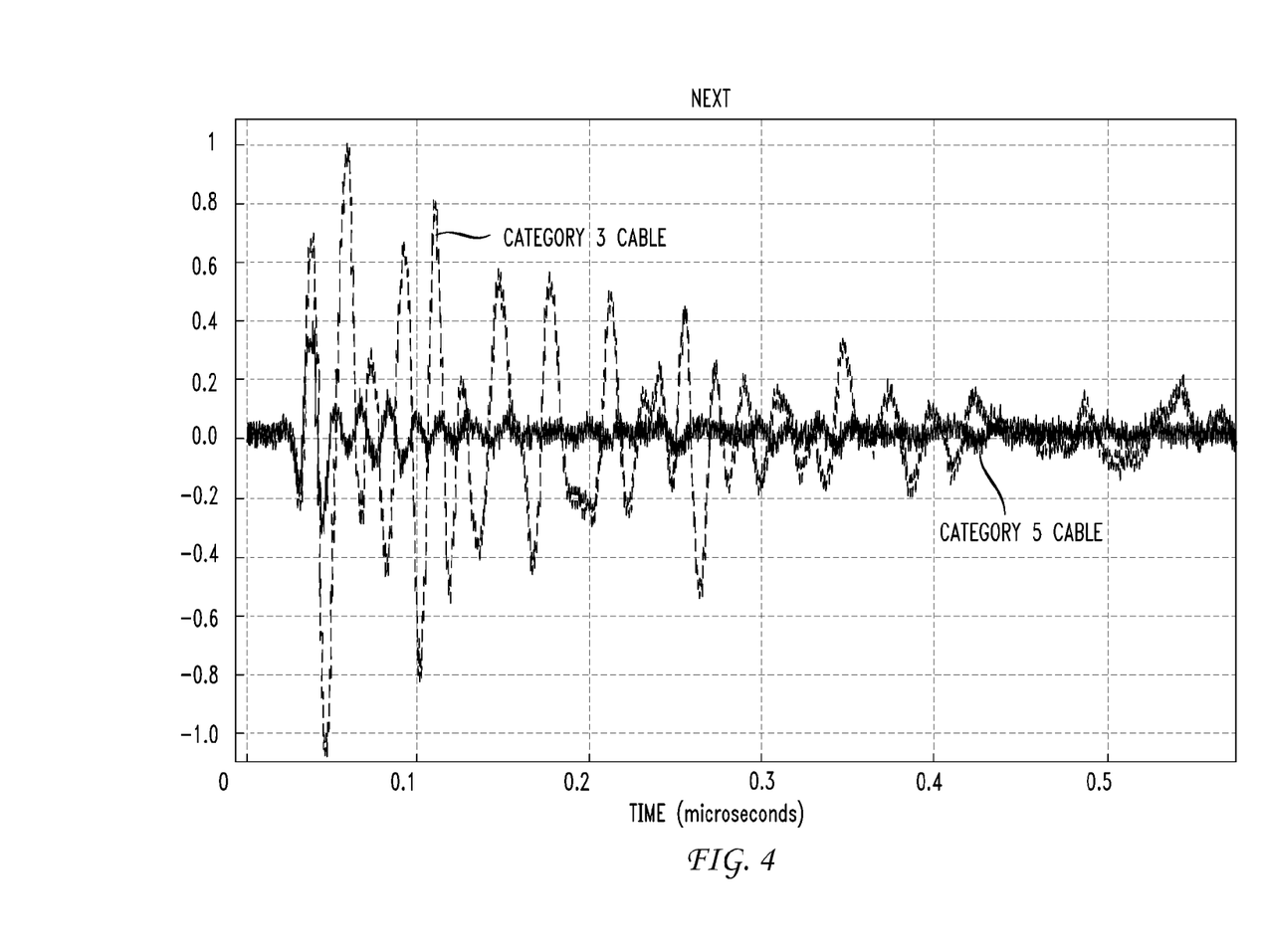
FIG. 4 illustrates an example of near end crosstalk measurements for Category 3 and Category 5 cable.

Cross talk is similar to insertion loss in that different cable types conform to their own standards defining cross talk over a range of frequencies. Electrical signals traveling down the cable injects noise to adjacent pairs differently with respect to the cable type. The cross talk is a function of both frequency and cable length and is well defined for each cable type. To determine the cable type, a PHY can transmit one, multiple or continuous pulses with pre-determined frequency components into the cable. At the receiving end, the PHY can measure the magnitude attenuation and phase distortion, then combine this information with cable length to determine the cable type. FIG. 4 illustrates an example of NEXT that can be measured for Category 3 and Category 5 cable.

In one embodiment, cable length can be determined directly using time domain reflectometry (TDR). In an alternative embodiment, cable length can be determined indirectly based on data generated in the measurement of insertion loss using a round trip of the injected signal. Here, the time interval between launching and receiving the pulse(s) is linearly proportional to the cable length. The cable length can then be computed by multiplying the propagation speed with the time interval, then divided by two to account for the round-trip delay.

As has been described, various cable characteristics can be used to determine a cable type. This cable-type information can be used to identify the channel characteristics indirectly. Alternatively, as will be described in greater detail below, the measured values themselves can be used to identify the channel characteristics directly. As would be appreciated, other characteristics beyond those described above could also be used to enable the PHY to determine the channel characteristics of the cabling. Regardless of the specific measurement data obtained and the process by which it is used, it is significant that the data can be used for configuration purposes in selecting one of the 10BASE-T and 10BASE-Te operating modes.

Figure 5:
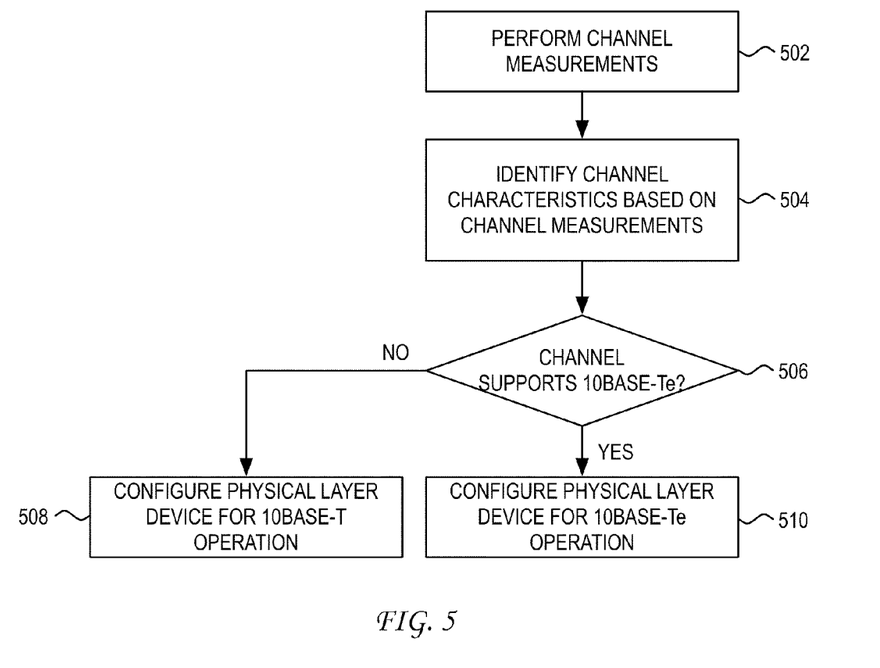
FIG. 5 illustrates a flowchart of a process of the present invention.

FIG. 5 illustrates an embodiment of a process that incorporates features of the present invention. As illustrated, the process begins at step 502 where channel measurements are performed. As noted above, in one embodiment, the channel measurements are performed by an echo cancellation module. In general, the specific measurements performed on the channel are implementation dependent. In various examples, the measurements can include insertion loss, cross-talk, cable length, or any other measurement that can provide an indication of the ability of the channel to support 10BASE-Te operation.

At step 504, the channel measurements are used to identify characteristics of the channel. It should be noted that this process can vary between implementations because of the different ways in which a measurement can be used as an indication of a channel characteristic. In one embodiment, the measurement can provide a direct indication of a channel characteristic. In another embodiment, the measurement can provide an indirect indication of a channel characteristic. For example, an insertion loss or cross-talk measurement can provide an indication of a cable type (e.g., Category 3 or Category 5 cabling). The indicated cable type can then be used as a proxy in identifying the channel characteristics of the cabling. As would be appreciated, the principles of the present invention can be applied to various installation scenarios where a non-standardized form of cabling may be used.

Regardless of the method by which the measurements are correlated to the channel characteristics, a determination is then made at step 506 as to whether the channel supports the 10BASE-Te operating mode. If it is determined at step 506 that the channel characteristics do not support the 10BASE-Te operating mode, then the PHY is configured for operation in the 10BASE-T operating mode at step 508.

In one embodiment, the configuration of the PHY at step 508 includes the disabling of the 10BASE-Te operating mode. For example, once the determination at step 506 indicates that the channel does not support 10BASE-Te, then the PHY can lock out the 10BASE-Te operating mode. This lock out would prevent a user from manually configuring the PHY to operate in the 10BASE-Te operating mode.

In another example, the PHY can adjust the autonegotiation information that is sent to the link partner. If it is assumed that autonegotiation information has been defined for the 10BASE-Te operating mode in addition to the 10BASE-T operating mode, then a PHY that supports both operating modes would send that capability information to the link partner in the autonegotiation process. If the link partner also supports both operating modes, then the autonegotiation process would result in the configuration of the 10BASE-Te operating mode, which would not work over the actual channel for which the measurements were obtained. In other words, by adjusting the autonegotiation information in response to the determination at step 506, the PHYs are prevented from configuring themselves to an unusable operating mode. Here, it should be noted that autonegotiation is not mandatory for 10BASE-T. Some implementations, for example, can send autonegotiation information to indicate support for EEE capability generally. This autonegotiation information can be confusing if there is separate EEE capability for different link speeds (e.g., 10 Mbit/s, 100 Mbit/s, 1 Gbit/s, etc.).

Returning to step 506, if it is determined at step 506 that the channel characteristics do support the 10BASE-Te operating mode, then the PHY is configured for operation in the 10BASE-Te operating mode at step 510. In an autonegotiation example, the PHY can send autonegotiation information that indicates that both the 10BASE-T and 10BASE-Te operating modes are supported. The link partner on the other end can then choose between the two operating modes based upon its own capabilities. If the link partner does not support 10BASE-Te, then it would autonegotiate to 10BASE-T. If the link partner does support 10BASE-Te, then it would autonegotiate to 10BASE-Te.

As noted above, in certain circumstances a 10BASE-Te PHY can interoperate with a 10BASE-T PHY. This scenario can also be built into the autonegotiation process by enabling each PHY on the link to identify its own operating mode based on the information available. The autonegotiation or other configuration process need not result in the same operating mode being used by both ends of the link. One of the factors that can also be considered in the autonegotiation or configuration process is the acceptable BER or packet errors for the link. This factor can increase the usage of the 10BASE-Te PHY operating mode.

In another example, the PHY can send other autonegotiation information that would enable the link partner to determine the capabilities of the channel. For example, the PHY can send an indication of the Category type of cable, channel characteristic information, measurement data, link performance data, or the like in one or more next page autonegotiation messages. As would be appreciated, the specific mechanism, whether autonegotiation or not, by which the PHY can communicate channel or capability information would not detract from the significance of using measurement-based information as part of the configuration process in selecting between the 10BASE-T and 10BASE-Te operating modes.

It should also be noted that the principles of the present invention can also be used in triple or quad speed devices that can support other link speeds in operating modes different from 10BASE-T and 10BASE-Te. Further, the principles of the present invention can be used in conjunction with such technologies as audio-video bridging (AVB), data-center bridging (DCB), or the like. Fields of applications can also include industrial, automotive and vehicular applications.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   measuring, by a first physical layer device, channel characteristics of an Ethernet cable that connects said first physical layer device to a second physical layer device, said measured channel characteristics enabling identification of a length of said Ethernet cable and a type of said Ethernet cable, wherein said first physical layer device supports both 10BASE-T and 10BASE-Te operating modes having the same link speed, said 10BASE-Te operating mode representing an energy saving operating mode;
   determining whether said measured channel characteristics indicate that said 10BASE-Te operating mode at the same link speed is supported by said identified length and type of said Ethernet cable;
   adjusting, based on said determination, autonegotiation information that indicates a set of operating modes for the same link speed supported by said first physical layer device, said adjusting being operative to include an indication of support for said 10BASE-Te operating mode by said first physical layer device; and
   transmitting, by said first physical layer device to said second physical layer device, said adjusted autonegotiation information that includes identified support by said first physical layer device of said 10BASE-Te operating mode when said determination indicates that said 10BASE-Te operating mode is supported by said Ethernet cable.

2. The method of claim 1, wherein said measuring comprises measuring an insertion loss characteristic.

3. The method of claim 1, wherein said measuring comprises measuring a cross talk characteristic.

4. The method of claim 1, wherein said determining comprises determining whether said Ethernet cable is Category 3 cable or a Category 5 cable.

5. The method of claim 1, wherein said transmitting comprises transmitting next page information.

6. A method, comprising:
   measuring, by a first physical layer device, channel characteristics of an Ethernet cable that connects said first physical layer device to a second physical layer device, said measured channel characteristics enabling identification of a length of said Ethernet cable and a type of said Ethernet cable, wherein said first physical layer device supports both 10BASE-T and 10BASE-Te operating modes having the same link speed, said 10BASE-Te operating mode representing an energy saving operating mode;
   determining whether said measured channel characteristics indicate that said 10BASE-Te operating mode at the same link speed is supported by said identified length and type of said Ethernet cable;
   generating autonegotiation information based on said determination, said generating being operative to include an indication of support for said 10BASE-Te operating mode by said first physical layer device; and
   transmitting, by said first physical layer device to said second physical layer device, said generated autonegotiation information, said generated autonegotiation information enabling said second physical layer device to identify whether said 10BASE-Te operating mode can be used.

7. The method of claim 6, wherein said measuring comprises measuring an insertion loss characteristic.

8. The method of claim 6, wherein said measuring comprises measuring a cross talk characteristic.

9. The method of claim 6, wherein said transmitting comprises transmitting an indication of the type of said Ethernet cable.

10. The method of claim 6, wherein said transmitting comprises transmitting an indication of the length of said Ethernet cable.

11. The method of claim 6, wherein said transmitting comprises transmitting an indication of said measured channel characteristic.

12. A physical layer device, comprising:
   a measurement circuit that is configured to measure channel characteristics of an Ethernet cable that connects said physical layer device to a link partner device, said measured channel characteristics enabling identification of a length of said Ethernet cable and a type of said Ethernet cable, wherein said physical layer device supports both 10BASE-T and 10BASE-Te operating modes having the same link speed, said 10BASE-Te operating mode representing an energy saving operating mode; and
   a configuration circuit that is configured to determine whether said measured channel characteristics indicate that said 10BASE-Te operating mode at the same link speed is supported by said identified length and type of said Ethernet cable, to adjust, based on said determination, autonegotiation information that indicates a set of operating modes for the same link speed supported by said physical layer device, said adjusting being operative to include an indication of support for said 10BASE-Te operating mode by said physical layer device, wherein said adjusted autonegotiation information is transmitted, by said physical layer device to said link partner device, said adjusted autonegotiation information including identified support by said physical layer device of said 10BASE-Te operating mode when said determination indicates that said 10BASE-Te operating mode is supported by said Ethernet cable.

13. The physical layer device of claim 12, wherein said measurement circuit measures an insertion loss characteristic.

14. The physical layer device of claim 12, wherein said measurement circuit measures a cross talk characteristic.

15. The physical layer device of claim 12, wherein said configuration circuit determines whether said Ethernet cable is a Category 3 cable or Category 5 cable.

* * * * *